(No Model.)

M. SCHREIBER.
INKSTAND.

No. 418,988. Patented Jan. 7, 1890.

Witnesses

Inventor
Martin Schreiber

UNITED STATES PATENT OFFICE.

MARTIN SCHREIBER, OF NUREMBERG, BAVARIA, GERMANY.

INKSTAND.

SPECIFICATION forming part of Letters Patent No. 418,988, dated January 7, 1890.

Application filed September 20, 1889. Serial No. 324,593. (No model.) Patented in Germany December 14, 1888, No. 47,828.

*To all whom it may concern:*

Be it known that I, MARTIN SCHREIBER, of Nuremberg, in the Kingdom of Bavaria and Empire of Germany, a subject of the Emperor of Germany, have invented certain new and useful Improvements in Inkstands, (for which I have obtained Letters Patent in Germany, No. 47,828, dated September 14, 1888, in the name of Johann Bammess,) of which invention the following is a specification.

The object of my invention is to provide an inkstand which is automatically closed by placing the pen-holder in a suitable receptacle provided for the same on the inkstand, and is automatically opened as soon as this pen-holder is removed from said receptacle.

The invention consists of the combination, with a casing, of levers pivoted in the same, a pen-holder-receiving socket supported by said levers, a rock-shaft, a transverse lever mounted on said rock-shaft and serving to operate one of said socket-supporting levers, a vertical shaft, a sleeve surrounding it, both having arms, a pawl-arm on the rock-shaft adapted to act on the arms of the rod and sleeve, and laterally-swinging cover-sections connected with the shaft and its sleeve.

The invention consists, also, in the construction and combination of parts and details, as will be fully described and set forth hereinafter, and finally pointed out in the claims.

Figure 1:
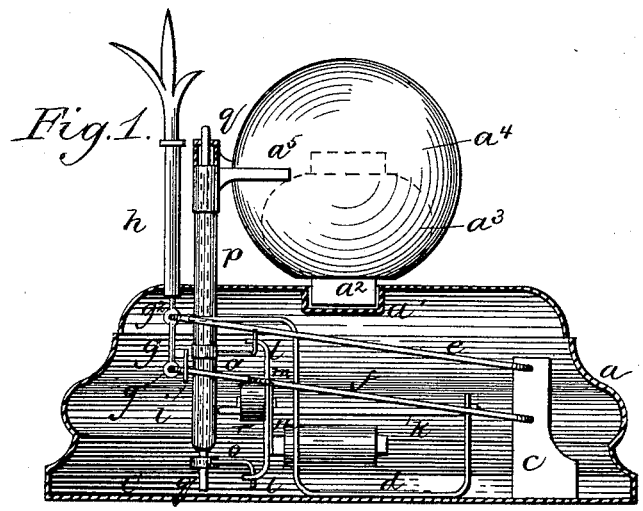
Figure 2:
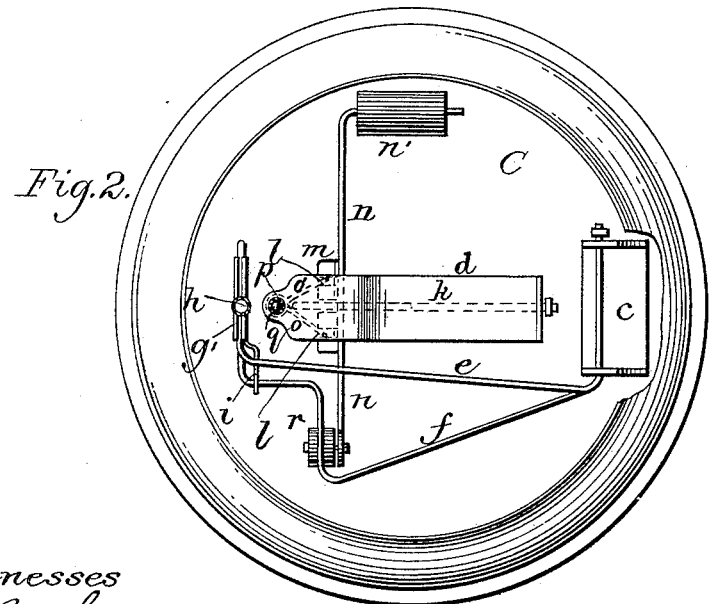

In the accompanying drawings, Figure 1 is a vertical longitudinal sectional view of my improved inkstand. Fig. 2 is a plan view of the operating mechanism, the ink-receptacle being removed.

Similar letters of reference indicate corresponding parts.

The mechanism is contained in a hollow metal casing $a$, provided in its top with a recess $a'$ for receiving a bottom plug $a^2$, projecting downward from the ink-receptacle $a^3$, which is shown in dotted lines. Two hemispherical cover-sections $a^4$, which can swing from and toward each other laterally, inclose the ink-receptacle, and said hemispherical cover-sections are secured to two arms $a^5$, projecting, respectively, from a vertical shaft $q$ and a sleeve $p$, surrounding said shaft. The shaft $q$ is provided at its lower end with an arm $o$, and the sleeve $p$ is provided with an arm $o'$ at its upper end. On a standard $d$ on the upper surface of the bottom of the casing $a$ the rock-shaft $k$ is mounted, on which is fixed the rocking lever $m$, carrying at one end a weight $n'$ and at the opposite end a roller $r$. A bent lever $f$ has one end mounted to rock in a standard $c$ on the upper surface of the bottom of the casing $a$. Part of said lever rests on the roller $r$, and the free end of said lever passes through a transverse sleeve $g'$ in the lower end of a rod $g$, on the upper end of which the receptacle or socket $h$ for receiving the pen-holder is secured. A brace $i$, secured to the rod $g$, is extended over to one side of the lever $f$ to prevent lateral movement and to guide the same. An additional bent lever $e$, also mounted to rock in the standard $c$, has its free end passed through a transverse sleeve $g^2$, also on the rod $g$, said two levers $e$ and $f$ serving for the purpose of giving the rod $g$ and pen-holder socket $h$ a vertical movement. A cam-arm $m$, secured on the rocking shaft $k$, is provided at each end with a notch $l$ for receiving the bent ends of the arms $o$ and $o'$ on the shaft $q$ and sleeve $p$, respectively.

The operation is as follows: When the pen-holder is placed into the socket $h$, its weight presses down said socket and the rod $g$, whereby the rear ends of the levers $e$ and $f$ are pressed down, and as the lever $f$ rests on the roller $r$ that end of the rocking lever $n$ carrying the roller $r$ is pressed downward and the end carrying the weight $n'$ is raised. Thereby the rocking cam-arm $m$ on the shaft $k$ is swung so as to turn the shaft $q$ and sleeve $p$ in such a manner that the cover-sections $a^4$ swing toward each other and inclose the ink well or bottle $a^3$. As soon as the pen-holder is removed the weight $n'$ swings downward, that end of the lever $n$ on which it is secured causing the opposite end of said lever $n$ to press upward the lever $f$, whereby the cam-arm $m$ is swung in such a manner as to turn the arms $o$ and $o'$ on the shaft $q$ and sleeve $p$ in the inverse direction, whereby the cover-sections $a^2$ are swung from each other and the ink-well is exposed.

Having thus described my invention, I claim as new and desire to secure by Letters Patent—

1. The combination, with a casing, of levers pivoted in the same, a pen-holder-receiving socket supported by said levers, a rock-shaft, a rocking lever fixed on said rock-shaft and serving to operate one of said socket-levers, a vertical shaft, a sleeve surrounding the shaft-arms on the shaft and sleeve, a cam-arm on the rock-shaft adapted to act on the arms of the rod and sleeve, and laterally-swinging cover-sections connected with the shaft and its sleeve, substantially as set forth.

2. The combination, with a casing, of swinging levers mounted in the same, a pen-holder-receiving socket supported by said levers, a rock-shaft in the casing, a rocking lever on said rock-shaft, a weight on one end of said rocking lever, an anti-friction roller on the opposite end, on which anti-friction roller one of the pen-holder-socket-supporting levers rests, a cam-arm on the rock-shaft, a vertical shaft, a sleeve surrounding it, arms on said shaft and sleeve, on which arms the opposite ends of the cam-arm can act, and laterally-swinging cover-sections adapted to inclose an inkstand resting on the casing, which cover-sections are secured to the vertical shaft and its sleeve, respectively, substantially as set forth.

3. The combination, with an inkstand-supporting casing, of laterally-swinging covers for inclosing said inkstand, a pen-holding-receptacle socket, and mechanism for operating the laterally-swinging cover from the pen-holding-receptacle socket, substantially as set forth.

In testimony that I claim the foregoing as my invention I have signed my name in presence of two subscribing witnesses.

MARTIN SCHREIBER.

Witnesses:
 ALEX. WIELES,
 LINDSEY REIL.